H. L. SCHULER.
HEADLIGHT.
APPLICATION FILED MAR. 8, 1909.
949,503.
Patented Feb. 15, 1910.
2 SHEETS—SHEET 1.
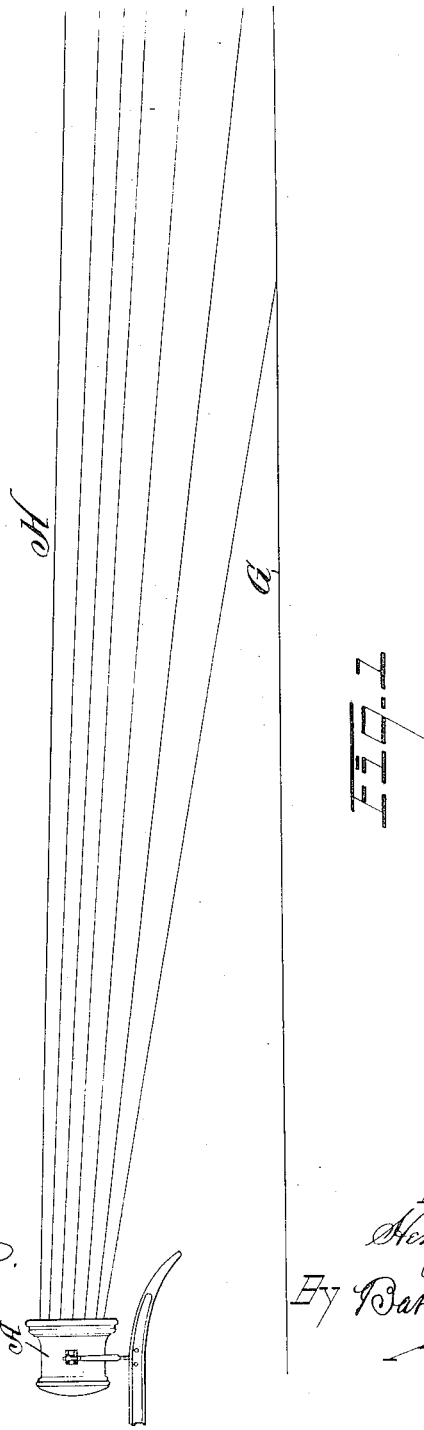
Witnesses:
Nathan F. Fetter.
Brennan B. West
Inventor:
Henry L. Schuler.
By Bates, Fouts & Hull
Attys

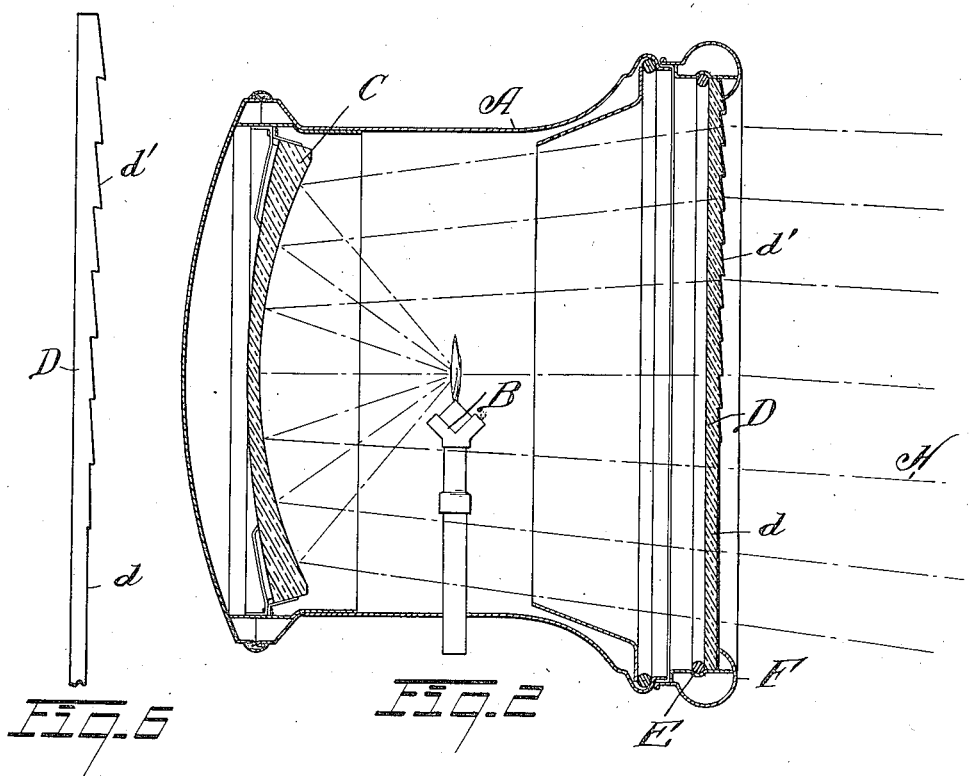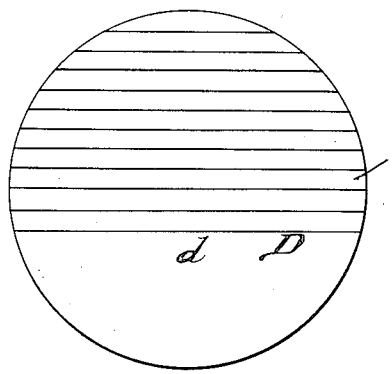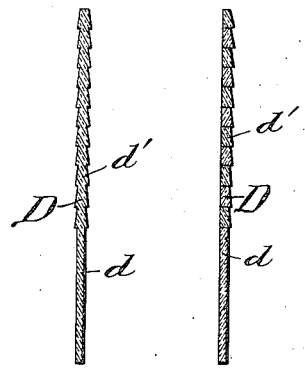

UNITED STATES PATENT OFFICE.

HENRY L. SCHULER, OF CLEVELAND, OHIO.

HEADLIGHT.

949,503.  Specification of Letters Patent.  Patented Feb. 15, 1910.

Application filed March 8, 1909. Serial No. 481,921.

*To all whom it may concern:*

Be it known that I, HENRY L. SCHULER, a citizen of the United States, residing at Cleveland, in the county of Cuyahoga and State of Ohio, have invented a certain new and useful Improvement in Headlights, of which the following is a full, clear, and exact description, reference being had to the accompanying drawings.

Headlights for automobiles, locomotives, trolley cars, conveyances, and other purposes as commonly constructed are provided with parabolic or spherical mirrors behind the source of light. The rays coming from such a light, while approximately parallel, are caused to slightly diverge in all directions, to give a wider field of illumination, by reason of the source of light being between the focus and the mirror. This flaring of the rays in all directions has been adapted to illuminate the ground and obstructions on the road, both at the right and left, as well as straight ahead, but it results in those rays which have an upward direction being wasted. Not only is a large portion of the light useless, but a positive disadvantage is introduced in the blinding effect caused to pedestrians or occupants of vehicles in front of the headlight. On the other hand, greatly concentrating the rays from such headlights serves to illuminate an insufficient area of the road or track to enable the operator to observe obstacles in time to avoid the same and is subject to the further objection of producing too great a contrast between the illuminated and the unilluminated portions of said road or track.

The object of this invention is to provide the headlight with means for deflecting the rays toward the ground without interfering with their lateral spreading, so that not only is a large amount of light saved, but the light is directed just where it is needed, and the interference with the vision of others is avoided.

To this end, I provide a headlight having the usual mirror with a glass front composed of prisms to deflect the rays of light toward the ground. This deflecting front is so formed that it bends the rays downwardly at a continuously greater angle as one progresses toward the top of the front so that the rays are caused to strike the ground at the desired distance and illuminate the ground for a desired space. The lateral flaring, however, is unaffected, so that the illumination is spread transversely, as desired. I effect this result by making the front in horizontal prismatic ribs, the angles between the front and back faces of which increase toward the top of the pane.

Inasmuch as the rays from the lower portion of the headlight are naturally inclining downwardly, I prefer to make the lower portion of my pane plane so as to allow the rays to pass through without bending. The upper portion may be made integral with the lower portion or separate, and this upper portion may be of one piece of glass or of independent strips, and the prismatic effect may be had by inclining both surfaces of the pane or one surface, as desired.

I will now describe the particular embodiment of my invention shown in the drawings, where—

Figure 1 is a side elevation of my headlight in the position it occupies in use on an automobile, for example, showing the deflection of the rays toward the ground; Fig. 2 is a vertical central section through the headlight; Fig. 3 is a front elevation on a reduced scale of the deflecting pane forming the front; Figs. 4 and 5 are sections of such pane in forms modified from that shown in Fig. 2; Fig. 6 is an exaggerated diagrammatic view of the upper portion of the pane showing the progressive angles of the prisms.

Referring to the parts by reference letters, A represents the casing of the headlight, B the burner where the source of light is produced, C the concave mirror which is a more or less accurate parabola and is suitably held at the inner end of the casing. D represents the pane at the front of the headlight which is shown as held in place against a suitable annular rib E by an annular cap F bearing against the outer side of the pane. The construction of the casing and its means for supporting the various parts is shown as illustrative, and these parts may be of any form. The pane D which I form to deflect the rays toward the ground may be a single piece of glass or made up of a number of pieces. The lower portion of the pane indicated by $d$ has preferably parallel faces. Above this portion are ribbed portions $d'$, the ribs extending horizontally from one side of the pane to the other. All these ribs may be one integral piece with the portion $d$ of the pane, as illustrated in Figs. 2 and 4, or they may be separate strips, as shown in Fig. 5. The two faces of the rib are formed at an angle to each other. The ribs may have the inclined portion all on one side, as shown in Figs. 2 and 5, or may be on both sides, as shown in Fig. 4.

Inasmuch as it is not desirable to change the lateral flare of the light, the prisms extend continuously from one side of the pane to the other so that the rays passing through any horizontal line are bent downwardly as a whole without changing the lateral divergence of such plane of rays.

In order to direct all the rays toward the ground the prisms at the upper portion of the pane D have a greater angle between the front and back faces than those near the center so that the bending of the rays increases as one proceeds upwardly from the central portion of the pane. Each rib is of a slightly greater angle than the one next below it. It will be observed that the portion of the pane which is provided with ribs or prisms extends below the source of light. This prevents rays of light from extending upwardly after passing through the pane, which prevents the waste of light and the blinding effect caused to pedestrians or occupants of vehicles in front of the headlight. This is illustrated in the exaggerated view of Fig. 6.

My construction is adaptable to any headlight. It enables the casing, the light and the mirror to be held in their natural positions while the light is all directed toward the ground. Moreover, the light is caused to strike the ground at the proper distance in advance of the vehicle and light is consolidated over just the desired space, whereby it is correspondingly intensified. There is accordingly a more effective illumination than would result if the ordinary headlight were bodily tipped downwardly sufficiently to throw all the rays to the ground for such tipping would give an unnecessary illumination to the ground immediately in front of the vehicle, and would necessitate an awkward position of the headlight. My invention gives the whole illumination just where it is desired, so that not only is the illumination more effective in itself, but it is prevented from being a source of annoyance and danger by shining in the eyes of people or horses in front of the vehicle.

Having thus described my invention, what I claim is:

1. The combination with a source of light, and a mirror, of a diaphanous pane having a portion provided with a series of horizontal ribs with inclined faces, said ribs extending continuously from one side of the pane to the other and increasing in angular divergence from the central portion upwardly, the rib-provided portion of the pane extending downwardly at least as far as the source of light.

2. A pane for a headlight having its lower portion with parallel faces and its upper portion formed with a series of ribs, the faces of which are at an angle to each other, the angles of successive ribs increasing as one progresses upwardly, said ribs extending the full width of the pane.

3. In a headlight, the combination, with a source of light, of a pane having its lower portion provided with parallel faces and its upper portion having a series of horizontal ribs, each rib being provided with inclined faces and extending continuously from one side of the pane to the other and increasing in angular divergence from the bottom upwardly, the rib-provided portion of the pane extending downwardly at least as far as the source of light.

In testimony whereof, I hereunto affix my signature in the presence of two witnesses.

HENRY L. SCHULER.

Witnesses:
ALBERT H. BATES,
A. J. HUDSON.